United States Patent
Sheppard et al.

(10) Patent No.: US 12,189,660 B2
(45) Date of Patent: Jan. 7, 2025

(54) METHODS AND APPARATUS TO DETERMINE A FREQUENCY DISTRIBUTION FOR DATA IN A DATABASE

(71) Applicant: The Nielsen Company (US), LLC, New York, NY (US)

(72) Inventors: Michael R. Sheppard, Holland, MI (US); Jonathan Sullivan, Hurricane, UT (US)

(73) Assignee: The Nielsen Company (US), LLC, New York, NY (US)

( * ) Notice: Subject to any disclaimer, the term of this patent is extended or adjusted under 35 U.S.C. 154(b) by 227 days.

(21) Appl. No.: 17/883,516

(22) Filed: Aug. 8, 2022

(65) Prior Publication Data

US 2023/0117942 A1  Apr. 20, 2023

Related U.S. Application Data

(60) Provisional application No. 63/256,379, filed on Oct. 15, 2021.

(51) Int. Cl.
*G06F 16/00* (2019.01)
*G06F 16/2455* (2019.01)
*G06F 16/28* (2019.01)

(52) U.S. Cl.
CPC ...... *G06F 16/285* (2019.01); *G06F 16/24554* (2019.01)

(58) Field of Classification Search
CPC ............ G06F 16/285; G06F 16/24554; G06F 16/2255
See application file for complete search history.

(56) References Cited

U.S. PATENT DOCUMENTS

| | | | |
|---|---|---|---|
| 6,108,637 A | 8/2000 | Blumenau | |
| 8,370,489 B2 | 2/2013 | Mazumdar et al. | |
| 2014/0172560 A1 | 6/2014 | Satyavolu et al. | |
| 2015/0170175 A1 | 6/2015 | Zhang et al. | |
| 2021/0359846 A1* | 11/2021 | Wright | H04L 9/0643 |

OTHER PUBLICATIONS

Ohayon, "ExtendedHyperLogLog: Analysis of a new Cardinality Estimator," arXiv, Jun. 17, 2021, 16 pages.

* cited by examiner

*Primary Examiner* — Yicun Wu

(57) ABSTRACT

Disclosed examples access data from a database, the data stored across multiple registers of the database; determine (a) a maximum rank for each of the multiple registers and (b) a maximum rank count for each of the multiple registers; determine a frequency distribution based on the maximum ranks and the maximum rank counts; and generate a report including at least one of the frequency distribution, the maximum ranks, or the maximum rank counts.

20 Claims, 10 Drawing Sheets

600

602　　　　　　604　　　　　606　　　　　　　　　　　　　　　608　　　　　　610

1. 'Alice'  -> 01001 -> [01][001] -> register 2, rank 3 ... M=[0 3 0 0], T=[0 1 0 0]
2. 'Bob'    -> 10111 -> [10][111] -> register 3, rank 1 ... M=[0 3 1 0], T=[0 1 1 0]
3. 'Alice'  -> 01001 -> [01][001] -> register 2, rank 3 ... M=[0 3 1 0], T=[0 2 1 0]
4. 'Charlie'-> 11100 -> [11][100] -> register 4, rank 1 ... M=[0 3 1 1], T=[0 2 1 1]
5. 'Dan'    -> 11010 -> [11][010] -> register 4, rank 2 ... M=[0 3 1 2], T=[0 2 1 1]
6. 'Eve'    -> 11011 -> [11][011] -> register 4, rank 2 ... M=[0 3 1 2], T=[0 2 1 2]

FIG. 6

METHODS AND APPARATUS TO DETERMINE A FREQUENCY DISTRIBUTION FOR DATA IN A DATABASE

RELATED APPLICATIONS

This patent claims the benefit of U.S. Provisional Patent Application No. 63/256,379, which was filed on Oct. 15, 2021. U.S. Provisional Patent Application No. 63/256,379 is hereby incorporated herein by reference in its entirety. Priority to U.S. Provisional Patent Application No. 63/256,379 is hereby claimed.

FIELD OF THE DISCLOSURE

This disclosure relates generally to computing systems, and, more particularly, to computing systems to determine a frequency distribution for data in a database.

BACKGROUND

Hyperloglog is a protocol, a process, and/or algorithm used to determine a cardinality of a list, set, group, etc. of numbers, items, identifiers, etc. As used herein, cardinality is defined as a number of unique entities (e.g., not including duplicates or repetitive entries). For example, the set of {A, B, A} has a cardinality of two because there are two unique entries (e.g., A and B), even though the set has a length of three (e.g., because the set includes three items including repeats). The hyperloglog process can estimate cardinalities for sets of over $10^9$ entries with an error of around 2%.

BRIEF DESCRIPTION OF THE DRAWINGS

FIG. 6 illustrates the augmented hyperloglog process described in conjunction with examples disclosed herein.

In general, the same reference numbers will be used throughout the drawing(s) and accompanying written description to refer to the same or like parts. The figures are not to scale.

Figure 1:
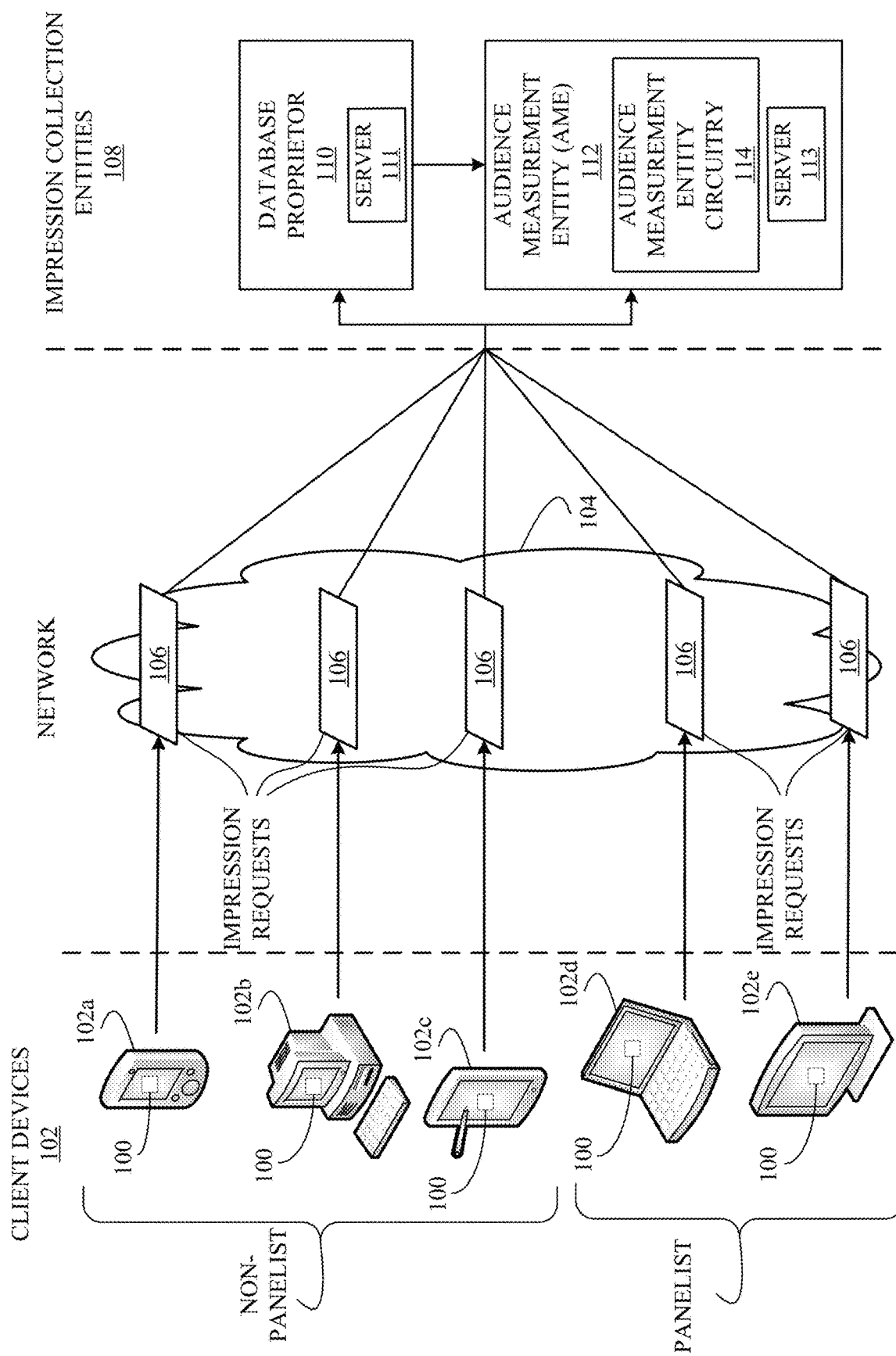
FIG. 1 illustrates example client devices that report audience impression requests for Internet-based media to impression collection entities to facilitate estimating sizes of audiences exposed to different Internet-based media and/or different unions of Internet-based media.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as advertisements and/or content, via digital television, desktop computers, mobile devices, etc. have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache.

Monitoring instructions cause monitoring data reflecting information about an access to the media (e.g., a media impression) to be sent from the client that downloaded the media to a monitoring entity in association with user identifying and/or device identifying information (e.g., a cookie). Sending the monitoring data from the client to the monitoring entity is known as an impression request (e.g., a hypertext transfer protocol (HTTP) request representing a media impression). Typically, the monitoring entity is an audience measurement entity (AME) that did not provide the media to the client and who is a trusted (e.g., neutral) third party for providing accurate usage statistics (e.g., The Nielsen Company, LLC).

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietor to recognize their subscribers when they visit their web site.

The protocols of the Internet make cookies inaccessible outside of the domain (e.g., Internet domain, domain name, etc.) on which they were set. Thus, a cookie set in, for example, the facebook.com domain is accessible to servers in the facebook.com domain, but not to servers outside that domain. Therefore, although an AME might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar et al. accomplish this task by structuring the AME to respond to impression requests from clients (who may not be a member of an audience member panel and, thus, may be unknown to the audience member entity) by redirecting the clients from the AME to a database proprietor, such as a social network site partnered with the audience member entity, using an impression response. Such a redirection initiates a communication session between the client accessing the tagged media and the database proprietor. For example, the impression response received from the AME may cause the client to send a second impression request to the database proprietor. In response to receiving this impression request, the database proprietor (e.g., Facebook) can access any cookie it has set on the client to thereby identify the client based on the internal records of the database proprietor. In the event the client corresponds to a subscriber of the database proprietor, the database proprietor logs/records a database proprietor demographic impression in association with the client/user.

As used herein, an impression is defined to be an event in which a home or individual accesses media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or television may be exposed to the same media via multiple devices (e.g., two or more of a mobile device, a tablet, a laptop, etc.) and/or via multiple media types (e.g., digital media available online, digital TV (DTV) media temporarily available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a census measurement science (CMS) tag executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is used to adjust cross-platform media exposure totals so that a single audience member is not counted multiple times for multiple exposures to the same media delivered/accessed via different media-delivery platforms.

As used herein, a unique audience (e.g., a unique audience size, deduplicated audience size, or audience size) is based on audience members distinguishable from one another. That is, a particular audience member exposed to particular media is measured as a single unique audience member regardless of how many times that audience member is exposed to that particular media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

An AME may want to find unique audience/deduplicate impressions across multiple database proprietors (DPs), custom date ranges, custom combinations of assets and platforms, etc. Some deduplication techniques used by an AME perform deduplication across DPs using additional systems (e.g., Audience Link, etc.). For example, such deduplication techniques match or probabilistically link personally identifiable information (PII) from each source. Such deduplication techniques require storing or exporting massive amounts of user data, using approximations instead of direct measurement or calculating audience overlap for all possible combinations, neither of which are desirable. PII data can be used to represent and/or access audience demographics (e.g., geographic locations, ages, genders, etc.)

Examples disclosed herein implement a HyperLogLog (HLL) deduplication technique to perform dynamic deduplication. HLL allows an AME to obtain the non-PII HLL outputs from various DPs, thereby allowing deduplication to be performed (a) on-the-fly, (b) using a fraction of the storage/computation of conventional deduplication techniques, (c) without sacrificing user or client privacy, and (d) using any number of data sources or assets. Examples disclosed herein dynamically deduplicate across many data sources to allow an AME to improve non-coverage, kids' measurements, and expanded demographics. The AME can improve non-coverage by combining multiple data sources so that the likelihood a person is not covered by an AME measurement is decreased and overlap between providers (e.g., database proprietors) can be seen. For example, the AME can improve kids' measurements by, if data sources with high kids' coverage and useful PII fields for matching are identified, confirming a kids' measurement by using demographic impression data form multiple database proprietors. The AME can improve expanded demographics when database proprietors with more specific demographic data are incorporated through direct matching and comparison with other database proprietors.

HLL is an algorithm and/or process for estimating unique counts. An HLL process includes sorting hashed values of data into a plurality of bins (e.g., m bins) of HLL data. To form the HLL data, hash values are assigned to bins based on a shared chunk or a shared number of bits (e.g., leading bits, or a number of most significant bits (MSBs)) across multiple hash values. The shared number of bits define an address (e.g., identical values get assigned to the same bin) of a corresponding bin in the HLL data. Multiple bins in the HLL data are defined by corresponding leading bits of the hash values. More bins in the HLL data correspond to more granularity, less noisy estimates, and more computer memory usage. Each hash value is used to update a bin's estimate of the overall unique audience member count represented by that bin of the HLL data. In this manner, the estimate of a unique audience size is also based on the hash values themselves. When a database proprietor receives the HLL data structure from each DP, the database proprietor can combine the multiple data structures into a single data structure, which will allow to compute an estimate for the union of all the DP audiences based on a modified average of the audience size estimate resulting therefrom. More specifically, the AME can combine the data structures from each DP by computing a new HLL data structure where only the hash information corresponding to the largest estimate is saved. In this manner, the AME uses the union to determine union HLL data based on the maximum uniqueness values between the bins of the HLL data sets. The AME then determines a normalized harmonic mean across all bins' estimates of the union HLL data set to calculate a final estimate of the overall unique audience member count.

Example HLL-based techniques disclosed herein may be used to count the number of unique items in a data stream (e.g., the number of unique panelist IDs, the number of database proprietor subscriber user IDs, etc. to determine unique audience counts or unique audience sizes). Some conventional methods to count unique items (e.g., unique audience members) include tracking each new value while reading through data and counting the number of unique values. However, such conventional techniques require a lot of computer memory to store the unique items. Additionally, previous unique counts (e.g., for unique audience members) cannot be reused when new impression data is received. Accordingly, new impression data requires recounting. Example HLL-based techniques disclosed herein may be used to directly address the limitations of such conventional techniques.

In some examples disclosed herein, HLL-based techniques can be used to deduplicate audience member data sets. For example, examples disclosed herein may perform deduplication using HLL "Building-Blocks." An AME can create HLL building-blocks by using a common PII input type and/or format across all DPs, assets, date ranges, etc. to create hash values by hashing PII input data (e.g., email addresses, phone numbers, a common concatenation of other PII information such as Name and Zip and Email, etc.). Using a common PII input type and/or format across all DPs, assets, data ranges, etc. to hash ensures values will be binned together correctly in corresponding bias (e.g., for different demographics, for PII, etc.). For example, a plurality of HLL bins (e.g., m HLL bins) may be created at the most granular level to be measured (e.g., m bins for each site, day, demographic buckets, etc.).

HLL-based techniques can be used to estimate cardinalities of a set with over $10^9$ unique entries with a standard error of 2% using 1.5 kB of memory. As described above, the cardinality of a set is a number of unique entries not counting any duplicates or repetitions, whereas the length is the number of entries including duplicates. The length of a large dataset is trivial to compute as an increment counter after each entry, whereas cardinality estimation belongs to a whole class of different count-distinct methodologies ranging in complexity. HLL can use an array of summary statistics to estimate the cardinality count. An array M of counters called registers can be set to 0 in their initial state. As shown below in Equation 1, the add operation (e.g., $j:=1+(x_1 x_2 \ldots x_b)_2$) includes computing a hash of an input data v with a hash function h (e.g., $x:=h(v)$), obtaining a value represented by the first b bits of a binary string when an entry is hashed (e.g., $(x_1 x_2 \ldots x_b)$), and adding one (1) to the first b bits (e.g., $1+(x_1 x_2 \ldots x_b)_2$) to obtain the address of the register (e.g., j) to modify. The subscript of 2 designates a binary or base two number. With the remaining bits, HLL computes $\rho(w)$ which is the position of the leftmost bit value of one (1). The new value of the register will be the maximum between the current value of the register and the position of the leftmost bit value one $\rho(w)$. M[j] is initialized to zero.

$$x:=h(v)$$

$$j:=1+(x1x2 \ldots xb)_2$$

$$w:=x_{b+1} x_{b+2} \ldots$$

$$M[j]:=\max(M[j], \rho(w)) \quad \text{(Equation 1)}$$

The output M is an array of positions of the leftmost bit values of one (1). Examples disclosed herein can use the output array M to estimate the cardinality. For example, an example output array could be M=[10, 15, 8, 5, . . . ]. Examples disclosed herein utilize a new counter T[j] to produce an argument version of the output array M which keeps track of the number of entries which had the maximum value of M[j] for register j. Examples disclosed herein use the counter T[j] to estimate unknown frequency distributions. The new counter T[j] (e.g., also initialized to 0) is incremented by one, stays the same, or returns back to the value of one conditioned on the relationship between the current value of the array M[j] and the position of the leftmost bit value one $\rho(w)$, as shown below in Equation 2.

$$\begin{cases} T[j] = T[j] + 1 & \text{if } \rho(w) = M[j] \\ M[j] = \rho(w) \\ T[j] = 1 & \text{if } \rho(w) > M[j] \end{cases} \quad \text{(Equation 2)}$$

As shown in Equation 2 above, if $\rho(w)$ is equal to the current maximum, examples disclosed herein increment the counter array T[j] by one. If $\rho(w)$ creates a new maximum, examples disclosed herein replace both the maximum value observed and reset the T[j] counter to 1. Accordingly, examples disclosed herein create a pair of values for the jth register as (M[j], T[j]). Examples disclosed herein use the array M to estimate the cardinality and use the augmented array T[j], in relation to M[j], to estimate the unknown frequency distribution.

The values of the augmented array T[j] correspond to information about the frequency distribution of a dataset and can provide a crude estimate of distribution of the values. For example, if the distribution of values are counts (e.g., counts of impressions) and exactly two different registers {j1, j2} correspond to a maximum count of ten (e.g., the count of the maximum rank of register j1 and j2 is 10, T[j1]=T[j2]=10), the frequency value for the maximum count of ten is 2. The frequency value can be normalized to produce a frequency distribution which sums to 100%. However, with such an approach it is unknown how many entries (e.g., audience members) produced those 10 counts (e.g., impressions). For example, the 10 counts could correspond to a single entry or data point (e.g., a single viewer of media) duplicated 10 times (e.g., a single viewer exposed to the media 10 times), a single entry duplicated eight times and a second entry duplicated two times, a single entry duplicated three times and a second entry duplicated seven times, 10 different entries appearing once, etc. Such a crude estimate does not take into account the likelihood that different unique entries are duplicated.

Examples disclosed herein utilize a Bayesian analysis that takes into account both the augmented array of counts for the maximum ranks of a register (e.g., T[j]) and the maximum ranks of the registers (e.g., M[j]). The larger the maximum rank, the higher the likelihood that one entry corresponds to most and/or all of the counts because it becomes increasingly more rare for two or more entries to have such a high maximum value. For example, examples disclosed herein determine a weighted frequency value based on weights that correspond to a likelihood of the observed augmented array of counts for the maximum ranks of each register being from one entry. For example, if the weights of the two registers described above is {0.1, 0.2}, then the frequency value at 10 (e.g., the frequency value at the maximum count of 10) would be the sum of the weights (e.g., 0.3). Examples disclosed herein normalize the weighted frequency value to produce a frequency distribution by dividing the weighted frequency value by the sum of the weights.

Examples disclosed herein treat each register and/or group of data from a database (data set) independent for notational simplicity. Based on the augmented hyperloglog process (also referred to as an augmented hyperloglog algorithm or an augmented hyperloglog protocol), examples disclosed herein can obtain an estimate of the number of unique entries within a register, n, along with the average frequency of occurrence, which are constant across the registers when determining the frequency distribution calculations. In examples disclosed herein, entries in a register may be user names, user identifiers, email addresses, IP addresses, shopping lists, etc. determined from a logged impression. However, examples disclosed herein can be adapted for use with entries representing any other suitable data or event including any type of media exposures (e.g., watching and/or hearing a television show, movie, advertisement, radio program, podcast, website, streaming audio and/or video, exposure to video game, etc.). For a particular register, the augmented hyperloglog process determines the maximum rank of a register and the number of times the maximum rank occurred (e.g., (rmax, t)). The ranks are geometrically distributed according to the below Equation 1.

$$Pr(R = r) = \left(\frac{1}{2}\right)^r \quad r = \{1, 2, \ldots\} \quad \text{(Equation 1)}$$

In Equation 1, r is the rank. The probability of success of an entry having a maximum rank of a particular register, given that rmax is the maximum observed is conditional on all other ranks being less, as illustrated in the below Equations 2 and 3.

$$p_1 \propto \left(\frac{1}{2}\right)^{rmax} \quad \text{(Equation 2)}$$

$$1 - p_1 \propto \sum_{k=1}^{rmax-1} \left(\frac{1}{2}\right)^r \quad \text{(Equation 3)}$$

Equation 2 and Equation 3 together yield the below Equation 4.

$$p_1 = \frac{1}{2^{rmax} - 1} \quad \text{(Equation 4)}$$

If k is the unknown number of entries for which r=rmax, each entry can have r=rmax with probability p1 and r<rmax with probability 1−p1, which forms a binomial distribution for k. However, because there is at least one entry with r=rmax, the distribution needs to be zero truncated to exclude the possibility of k=0 resulting in the below Equation 5.

$$Pr(X = k; n; p_1 | k \geq 1) = \frac{\binom{n}{k} p_1^k (1 - p_1)^{n-k}}{1 - (1 - p_1)^n} \quad k = \{1, \ldots, n\} \quad \text{(Equation 5)}$$

Examples disclosed herein can calculate the probability Pr(X=1) directly yielding a first estimate of the weighted frequency, but this does not take into account the distribution of obtaining the observed t counts with the maximum rank. Accordingly, examples disclosed herein model the distribution condition not only on k≥1 but also on the known (rmax, t) pair together. With X being the distribution of the number of unique entries with r=rmax, examples disclosed herein model the number of times an entry appears as Y. While X is the true distribution of ranks for each unique entry within the corresponding register, the exact distribution for the distribution for frequency of those unique entries has not traditionally been known. Accordingly, examples disclosed herein utilize a prior distribution for the frequency and apply Baye's theorem conditioning on the known pair (rmax, t) to generate a posterior updated weight for the frequency value t of occurring which will be closer to the true unknown distribution.

Examples disclosed herein utilize a geometric distribution on i={1, 2, 3, ...} for the prior distribution for the frequency with an expected value equal to the true known mean μ. The probability mass function and expected values are shown in the below Equations 6 and 7.

$$Pr(Y = i; p_2) = p_2(1 - p_2)^{i-1} \quad i = \{1, 2, \ldots\} \quad \text{(Equation 6)}$$

$$E(Y; p_2) = \frac{1}{p_2} = \mu \quad \text{(Equation 7)}$$

Because μ is known, $p_2$ is also known (e.g., $$p_2 = \frac{1}{\mu}\bigg).$$

Examples disclosed herein use the above Equations 6 and 7 (corresponding to the prior frequency distribution of numbers of entries) as a starting point and update with known information. If k unique entries exist, the number of occurrences would be the probabilistic sum of k independent of Y distributions. Because examples disclosed herein let Zk be the sum of k independent geometric distributions with parameter $p_2$, Zk=Y1+ . . . +Yk and Zk is the negative binomial distribution with parameters (k, p2) on the domain d={k, k+1, k+2, . . . }, as shown below in the below Equation 8.

$$Pr(Z_k = j; k; p_2) = \binom{j-1}{k-1} p_2^k (1 - p_2)^{j-k} \quad \text{(Equation 8)}$$

The above Equation 8 is also referred to as the Pascal distribution or the negative binomial distribution of type 2, to distinguish it from type 1 with domain beings at j=0, which is the sum of the geometric distribution which also begins at i=0. In some examples, the negative binomial distribution may be defined differently, depending on where the support starts and if using probability of success or probability of failure.

Examples disclosed herein estimate the conditional probability X=1 given some known count and probabilities {t, p1, p2}. For example, given the observed t counts (e.g., from the augmented hyperloglog process), examples disclosed herein determine the probability that the counts come from one unique entry by determining a posterior weight applied to the counts to construct the frequency distribution, using Bayes' theorem, as shown below in Equation 9.

$$\begin{aligned} Pr(X - 1|Z = t) &= \frac{Pr(X = 1, Z = t)}{Pr(Z = t)} \\ &= \frac{Pr(X = 1, Z_1 = t)}{\sum_{k=1}^{n} Pr(X = k, Z_k = t)} \\ &= \frac{Pr(X = 1)Pr(Z_1 = t)}{\sum_{k=1}^{n} Pr(X = k)Pr(Z_k = t)} \end{aligned} \quad \text{(Equation 9)}$$

The first line of the above-Equation 9 is the definition of a conditional probability, the second line of the above-Equation 9 expands the denominator as the sum of obtaining Zk=t across the combinations of numbers of unique entries (e.g., k=1, k=2, . . . , or k=n), and the third line of the above-Equation 9 uses the assumption that X and Z are independent. The below Equation 10 corresponds to a simplification of the product of Equation 9.

$$Pr(X = 1)Pr(Z_1 = t) = cs^k \binom{t-1}{k-1}\binom{n}{k} \quad \text{(Equation 10)}$$

The constants c and s of Equation 10 are defined below in Equations 11 and 12.

$$c = \left(\frac{(1-p_1)^n(1-p_2)^t}{1-(1-p_1)^n}\right) \quad \text{(Equation 11)}$$

$$s = \left(\frac{p_1}{1-p_1}\right)\left(\frac{p_2}{1-p_2}\right) \quad \text{(Equation 12)}$$

The constant c is independent of k and will cancel out when dividing, so it can be ignored for both numerator and denominator equally, which turns the individual terms from equality to proportionality (e.g., the ratio is still an equality), as shown in the below Equation 13.

$$Pr(X=1)Pr(Z_1=t) \propto s^k \binom{t-1}{k-1}\binom{n}{k} \quad \text{(Equation 13)}$$

For the numerator, examples disclosed herein can directly substitute k=1 to obtain the below Equation 14.

$$Pr(X=1)Pr(Z_1=t) \propto (ns) \quad \text{(Equation 14)}$$

The denominator can be evaluated by a direct combinatorial identity using hypergeometric functions, as shown below in Equation 15.

$$\sum_{k=1}^{n} Pr(X=k)Pr(Z_k=t) \propto \sum_{k=1}^{n} s^k \binom{t-1}{k-1}\binom{n}{k} = \quad \text{(Equation 15)}$$
$$(ns)\,_2F_1(1-n, 1-t; 2; s)$$

Equation 16 below defines the Gaussian hypergeometric function $_2F_1(a, b; c; z)$.

$$_2F_1(a, b; c; z) = \quad \text{(Equation 16)}$$
$$\sum_{n=0}^{\infty} \frac{(a)n(b)n}{(c)n}\frac{z^n}{n!} = 1 + \frac{ab}{z}\frac{z}{1} + \frac{a(a+1)b(b+1)}{c(c+1)}\frac{z}{2!} + \ldots$$

Dividing the Equation 15 and Equation 16, the constant of proportionality term (ns) cancels out and the final posterior estimate is determined using the below Equation 17.

$$Pr(X=1|Z=t) = \frac{1}{2F1(1-n, 1-t; 2; s)} \quad \text{(Equation 17)}$$

Although s and $_2F_1$ are defined above in conjunction with Equations 12 and 16, s may also be defined in terms of rmax and μ directly and $_2F_1$ of Equation 16 may be defined in terms of 1−n, 1−t, 2, and 2, as shown below in conjunction with Equations 18 and 19.

$$S = \left(\frac{1}{2^{rmax}-2}\right)\left(\frac{1}{\mu-1}\right) \quad \text{(Equation 18)}$$

The posterior weight is the weight for the register at the observed frequency t. Because the first two entries within Equation 17 for the hypergeometric are negative, the infinite sum within the definition is a finite sum of a polynomial evaluation of at most degree min{n,t}−1. When t=1, Pr(X=1|Z=1)=1 is independent of all other quantities.

FIG. 1 illustrates example client devices 102 that report audience impression requests for Internet-based media 100 to impression collection entities 108 to identify a unique audience and/or a frequency distribution for the Internet-based media. The illustrated example of FIG. 1 includes the example client devices 102, an example network 104, example impression requests 106, and the example impression collection entities 108. As used herein, an impression collection entity 108 refers to any entity that collects impression data such as, for example, an example AME 112 and/or an example database proprietor 110. In the illustrated example, the AME 112 includes an example audience measurement entity circuitry 114.

The example client devices 102 of the illustrated example may be any device capable of accessing media over a network (e.g., the example network 104). For example, the client devices 102 may be an example mobile device 102a, an example computer 102b, 102d, an example tablet 102c, an example smart television 102e, and/or any other Internet-capable device or appliance. Examples disclosed herein may be used to collect impression information for any type of media including content and/or advertisements. Media may include advertising and/or content delivered via websites, streaming video, streaming audio, Internet protocol television (IPTV), movies, television, radio and/or any other vehicle for delivering media. In some examples, media includes user-generated media that is, for example, uploaded to media upload sites, such as YouTube, and subsequently downloaded and/or streamed by one or more other client devices for playback. Media may also include advertisements. Advertisements are typically distributed with content (e.g., programming, on-demand video and/or audio). Traditionally, content is provided at little or no cost to the audience because it is subsidized by advertisers that pay to have their advertisements distributed with the content. As used herein, "media" refers collectively and/or individually to content and/or advertisement(s).

The example network 104 is a communications network. The example network 104 allows the example impression requests 106 from the example client devices 102 to the example impression collection entities 108. The example network 104 may be a local area network, a wide area network, the Internet, a cloud, or any other type of communications network.

The impression requests 106 of the illustrated example include information about accesses to media at the corresponding client devices 102 generating the impression requests. Such impression requests 106 allow monitoring entities, such as the impression collection entities 108, to collect a number of media impressions for different media accessed via the client devices 102. By collecting media impressions, the impression collection entities 108 can generate media impression quantities for different media (e.g., different content and/or advertisement campaigns).

The impression collection entities 108 of the illustrated example include the example database proprietor 110 and the example AME 112. In the illustrated example, the example database proprietor 110 may be one of many database proprietors that operate on the Internet to provide services to subscribers. Such services may be email services, social networking services, news media services, cloud storage services, streaming music services, streaming video services, online retail shopping services, credit monitoring services, etc. Example database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, etc.), and/or any other site that maintains user registration records.

In some examples, execution of the beacon instructions corresponding to the media 100 causes the client devices 102 to send impression requests 106 to servers 111, 113 (e.g., accessible via an Internet protocol (IP) address or uniform resource locator (URL)) of the impression collection entities 108 in the impression requests 106. In some examples, the beacon instructions cause the client devices 102 to provide device and/or user identifiers and media identifiers in the impression requests 106. The device/user identifier may be any identifier used to associate demographic information with a user or users of the client devices 102. Example device/user identifiers include cookies, hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), an Ad ID (e.g., an advertising ID introduced by Apple, Inc. for uniquely identifying mobile devices for purposes of serving advertising to such mobile devices), third-party service identifiers (e.g., advertising service identifiers, device usage analytics service identifiers, demographics collection service identifiers), etc. In some examples, fewer or more device/user identifier(s) may be used. The media identifiers (e.g., embedded identifiers, embedded codes, embedded information, signatures, etc.) enable the impression collection entities 108 can identify to media (e.g., the media 100) objects accessed via the client devices 102. The impression requests 106 of the illustrated example cause the AME 112 and/or the database proprietor 110 to log impressions for the media 100. In the illustrated example, an impression request is a reporting to the AME 112 and/or the database proprietor 110 of an occurrence of the media 100 being presented at the client device 102. The impression requests 106 may be implemented as a hypertext transfer protocol (HTTP) request. However, whereas a transmitted HTTP request identifies a webpage or other resource to be downloaded, the impression requests 106 include audience measurement information (e.g., media identifiers and device/user identifier) as its payload. The server 111, 113 to which the impression requests 106 are directed is programmed to log the audience measurement information of the impression requests 106 as an impression (e.g., a media impression such as advertisement and/or content impressions depending on the nature of the media accessed via the client device 102). In some examples, the server 111, 113 of the database proprietor 101 or the AME 112 may transmit a response based on receiving an impression request 106. However, a response to the impression request 106 is not necessary. It is sufficient for the server 111, 113 to receive the impression request 106 to log an impression request 106. As such, in examples disclosed herein, the impression request 106 is a dummy HTTP request for the purpose of reporting an impressions but to which a receiving server need not respond to the originating client device 102 of the impression request 106.

The example database proprietor 110 maintains user account records corresponding to users registered for services (such as Internet-based services) provided by the database proprietors. That is, in exchange for the provision of services, subscribers register with the database proprietor 110. As part of this registration, the subscribers provide detailed demographic information to the database proprietor 110. Demographic information may include, for example, gender, age, ethnicity, income, home location, education level, occupation, etc. In the illustrated example, the database proprietor 110 sets a device/user identifier on a subscriber's client device 102 that enables the database proprietor 110 to identify the subscriber.

In the illustrated example, the example AME 112 does not provide the media 100 to the client devices 102 and is a trusted (e.g., neutral) third party (e.g., The Nielsen Company, LLC) for providing accurate media access (e.g., exposure) statistics. The example AME 112 includes the example audience measurement entity circuitry 114. As further disclosed herein, the example audience measurement entity circuitry 114 executes an augmented hyperloglog protocol to be able to generate a frequency distribution of impressions counts stored in a database to determine how many impressions correspond to particular users, as further described below.

In operation, the example client devices 102 employ web browsers and/or applications (e.g., apps) to access media. Some of the web browsers, applications, and/or media include instructions that cause the example client devices 102 to report media monitoring information to one or more of the example impression collection entities 108. That is, when the client device 102 of the illustrated example accesses media, a web browser and/or application of the client device 102 executes instructions in the media, in the web browser, and/or in the application to send the example impression request 106 to one or more of the example impression collection entities 108 via the network (e.g., a local area network, wide area network, wireless network, cellular network, the Internet, and/or any other type of network). The example impression requests 106 of the illustrated example include information about accesses to the media 100 and/or any other media at the corresponding client devices 102 generating the impression requests 106. Such impression requests allow monitoring entities, such as the example impression collection entities 108, to collect media impressions for different media accessed via the example client devices 102. In this manner, the impression collection entities 108 can generate media impression quantities for different media (e.g., different content and/or advertisement campaigns).

When the example database proprietor 110 receives the example impression request 106 from the example client device 102, the example database proprietor 110 requests the client device 102 to provide a device/user identifier that the database proprietor 110 had previously set for the example client device 102. The example database proprietor 110 uses the device/user identifier corresponding to the example client device 102 to identify the subscriber of the client device 102.

The example AME 112 receives database proprietor demographic impression data from the example database proprietor 110. The database proprietor demographic impression data may include information relating to a total number of the logged database proprietor impressions that correspond with a registered user of the database proprietor 110 and/or any other information related to the logged database proprietor impressions (e.g., demographics, a total number of registered users exposed to the media 100 more than once, etc.). The example audience measurement entity circuitry 114 performs an augmented hyperloglog protocol to generate a frequency distribution based on impression requests 106.

Figure 2:
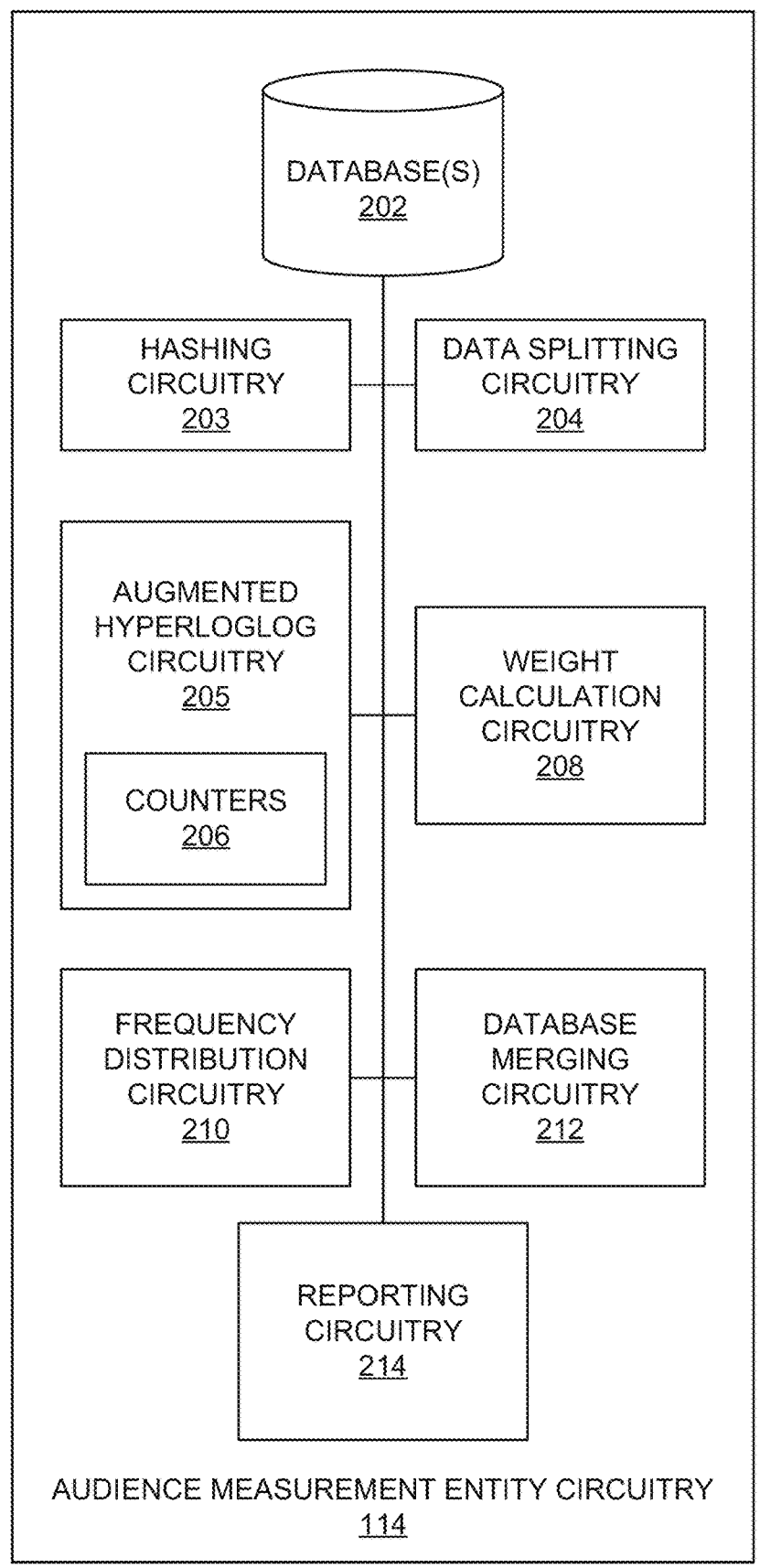
FIG. 2 is a block diagram of example audience measurement entity circuitry.

FIG. 2 illustrates an example block diagram of example audience measurement entity circuitry 114. The example audience measurement entity circuitry 114 includes example database(s) 202, example hashing circuitry 203, example data splitting circuitry 204, example augmented hyperloglog circuitry 205, example counters 206, example weight calculation circuitry 208, example frequency distribution circuitry 210, and example database merging circuitry 212.

The example audience measurement entity circuitry 114 of FIG. 2 is a computing device and/or processing device that is capable of storing datasets, implementing an augmented hyperloglog process and determining a frequency distribution for the datasets based on the information obtained via the augmented hyperloglog process. The audience measurement entity circuitry 114 may be a computer, a server, and/or any other computing device. In some examples the audience measurement entity circuitry 114 more or fewer components than those shown in the example of FIG. 2. For example, the audience measurement entity circuitry 114 may include one or more interfaces to (a) obtain the data that is stored in the database(s) 202, (b) log impressions obtained via network communications that may be stored in the database(s) 202, (c) transmit generated reports corresponding to results of the augmented hyperloglog and/or estimated frequency distribution data to other devices. Additionally, the example audience measurement entity circuitry 114 may include a user interface to display results of the augmented hyperloglog and/or estimated frequency distribution data.

The example database(s) 202 of FIG. 2 are storage devices (e.g., memory, storage, etc.) that includes one or more datasets. In the example of FIG. 2, the dataset corresponds to media exposure data (e.g., impression data, visitors to one or more websites, and/or any other media exposure data that relates panelist and/or audience identifiers to media accesses). However, the dataset may correspond to any type of data.

The example hashing circuitry 203 of FIG. 2 hashes the impressions and/or identifying information from the database(s) 202 into a binary hash. For example, the hashing circuitry 203 can hash an impression stored in the database 202 corresponding to a first person to generate the binary string [01001]. After the impressions and/or corresponding identifying information from the database(s) 202 are hashed, the example data splitting circuitry 204 splits the first b bits of the hash into one group and the remaining bits of the hash into a second group. For example, the data splitting circuitry 204 can split the hash [01001] into a first group of two bits (e.g., [01]) and a second group of the remaining three bits (e.g., [001]). The number of bits to generate the first group may be based on user and/or manufacturer preferences. A larger number of bits for the first group may correspond in a more accurate cardinality estimation but require more resources while a small number of bits may result in a less accurate cardinality estimation but require less resources. The first group of bits corresponds to the register that the data will belong to. For example, for a two bit group, [00] can be the first register, [01] can be the second register, [10] can be the third register, and [11] can be the fourth register. In this manner, the data splitting circuitry 204, by splitting the hashed value into two groups, groups the data of the database(s) 202 into different groups based on a register number. The value of the second ground (e.g., the remaining bits from the split) can be used to determine a rank for the hashed value. For example, the rank of the hashed value may correspond to the position of the left most one (e.g., [001] has a rank of three because the left most one is in the third position). In some examples, the rank of the hashed value corresponds to the number of leading zeros in the remaining bits plus one (e.g., [001] has a rank of three because there are two leading zeros).

The example augmented hyperloglog circuitry 205 of FIG. 2 performs an augmented hyperloglog process. The augmented hyperloglog process not only determines the maximum rank of data in the grouped data of the database(s) 202 (e.g., for the full dataset) (e.g., corresponding to the above Equation 1), but also determines the maximum rank count corresponding to the number of times that the maximum rank occurred in the respective registers (e.g., corresponding to the above Equation 2). In some examples, the augmented hyperloglog circuitry 205 determines the cardinality of the dataset stored in the example database(s) 202 using an array of maximum ranks (e.g., M[j]) determined using the above Equation. The example augmented hyperloglog circuitry 205 determines an array of the maximum ranks of the registers and the corresponding counts of how many times the maximum rank occurred in the corresponding registers (e.g., maximum rank count, T[j]) using the example counters 206. For example, the augmented hyperloglog circuitry 205, for a particular register, increments the counter 206 corresponding to a maximum rank count when the rank determined during the hyperloglog process is equal to the maximum rank and resets the counter 206 corresponding to the maximum rank count when the rank determined during the hyperloglog process is greater than the previous determined maximum rank, as described above in Equation 2. In some examples, a counter 206 is implemented for each register (e.g., to track multiple maximum rank counts in parallel). In some examples, a counter 206 is reused for multiple registers (e.g., a first count for a first register is determined using a counter, then the count is stored in local memory and the same counter is reset to determine a second count for a second register, etc.).

The example weight calculation circuitry 208 of FIG. 2 determines the posterior weights of the maximum rank counts (T[j]) based on the information determined by the example augmented hyperloglog circuitry 205. For example, for each register of a database 202, the example weight calculation circuitry 208 uses the number of unique entries per register, the average number of unique entries per register, the maximum ranks of the respective registers, and the maximum rank counts of the respective registers to determine the posterior weights for the respective register. For example, the weight calculation circuitry 208 determines the number of unique entries per register by dividing the number of unique entries across all registers by the number of registers. The example weight calculation circuitry 208 determines the average number of unique entries per register by dividing the number of entries in a database by the number of unique entries across all registers. The example weight calculation circuitry 208 determines the posterior weight for a particular entry using the average number of unique entries per register and the maximum rank of the register to determine a value for s, using the above Equation 28. After the value of s is determined, the example weight calculation circuitry 208 determines the Gaussian hypergeometric function value using the determined value of s and the above Equation 29. After the Gaussian hypergeometric function value is determined, the example weight calculation circuitry 208 determines the posterior weight for the register using the Gaussian hypergeometric function value and the above Equation 27.

The example frequency distribution circuitry 210 of FIG. 2 determines the frequency distribution of the dataset stored in one or more of the databases 202 based on the maximum rank counts of the registers. After the weight calculation circuitry 208 determines the posterior weights for each register of the database 202, the example frequency distribution circuitry 210 identifies the posterior weights of all the registers that correspond to each determined maximum rank count across the registers. For example, if the $4^{th}$ register, the $100^{th}$ register, and the $600^{th}$ register all correspond to the maximum rank count of 11 (e.g., the maximum rank of the $4^{th}$ register, $100^{th}$ register, and $600^{th}$ register appeared 11 times in the respective registers), the example weight calculation circuitry 108 identifies the posterior weights calculated for the $4^{th}$ register, the $100^{th}$ register, and the $600^{th}$ register. The example weight calculation circuitry 208 determines the frequency value by summing the posterior weights for the identified registers that correspond to the same maximum rank count. After the frequency values of all the maximum rank counts are determined, the example weight calculation circuitry 208 determines the frequency distribution by normalizing the frequency values to sum to 100%.

The example database merging circuitry 212 of FIG. 2 is able to merge the hyperloglog data from two or more database(s) 202 for the determination of the frequency distribution, without actually merging the data from the two or more database(s) 202 in a same database or storage location. For example, the database merging circuitry 212 can merge data determined from multiple augmented hyperloglog processes corresponding to different databases 202. The example database merging circuitry 212 can merge m datasets at the register level using the below Equation 3.

$$M_{union}[j] = \max(M_1[j], \ldots, M_m[j])$$

$$T_{union}[j] = \Sigma_{i=1}^{m}[M_i[j] = M_{union}[j]]T_i[j] \quad \text{(Equation 3)}$$

Equation 3 results in a merged maximum rank that is the maximum of all the maximum ranks and counts that are only the sum of individual counts whose maximum rank equals the overall merged maximum rank. In some examples, the database merging circuitry 212 determines the Iversion bracket using the below Equation 4.

$$[P] = \begin{cases} 1 & \text{if } P \text{ is true;} \\ 0 & \text{otherwise.} \end{cases} \quad \text{(Equation 4)}$$

In Equation 4, P is a general statement or proposition to determine if true or not. In examples where the maximum rank and maximum rank counts are merged, the example database merging circuitry 212 may combine and store the total length of the databases so that the example weight calculation circuitry 208 can determine the average number of unique entries per register and the example augmented hyperloglog circuitry 204 can determine the cardinality based on the merged dataset from the $M_{union}$.

While an example manner of implementing the server 113 of FIG. 1 and/or audience measurement entity circuitry 114 is illustrated in FIG. 2, one or more of the elements, processes and/or devices illustrated in FIG. 2 may be combined, divided, re-arranged, omitted, eliminated and/or implemented in any other way. Further, the example server 113, the example database(s) 202, the example augmented hyperloglog circuitry 205, the example counters 206, the example weight calculation circuitry 208, the example frequency distribution circuitry 210, the example database merging circuitry 212, and/or, more generally, the example audience measurement entity circuitry 114 of FIG. 2 may be implemented by hardware alone or by hardware in combination with software and/or firmware. Thus, for example, any of the example server 113, the example database(s) 202, the example augmented hyperloglog circuitry 205, the example counters 206, the example weight calculation circuitry 208, the example frequency distribution circuitry 210, the example database merging circuitry 212, and/or, more generally, the example audience measurement entity circuitry 114 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). Further still, the example server 113, and/or the example audience measurement entity circuitry 114 of FIG. 2 may include one or more elements, processes and/or devices in addition to, or instead of, those illustrated in FIG. 2, and/or may include more than one of any or all of the illustrated elements, processes, and devices.

Figure 3:
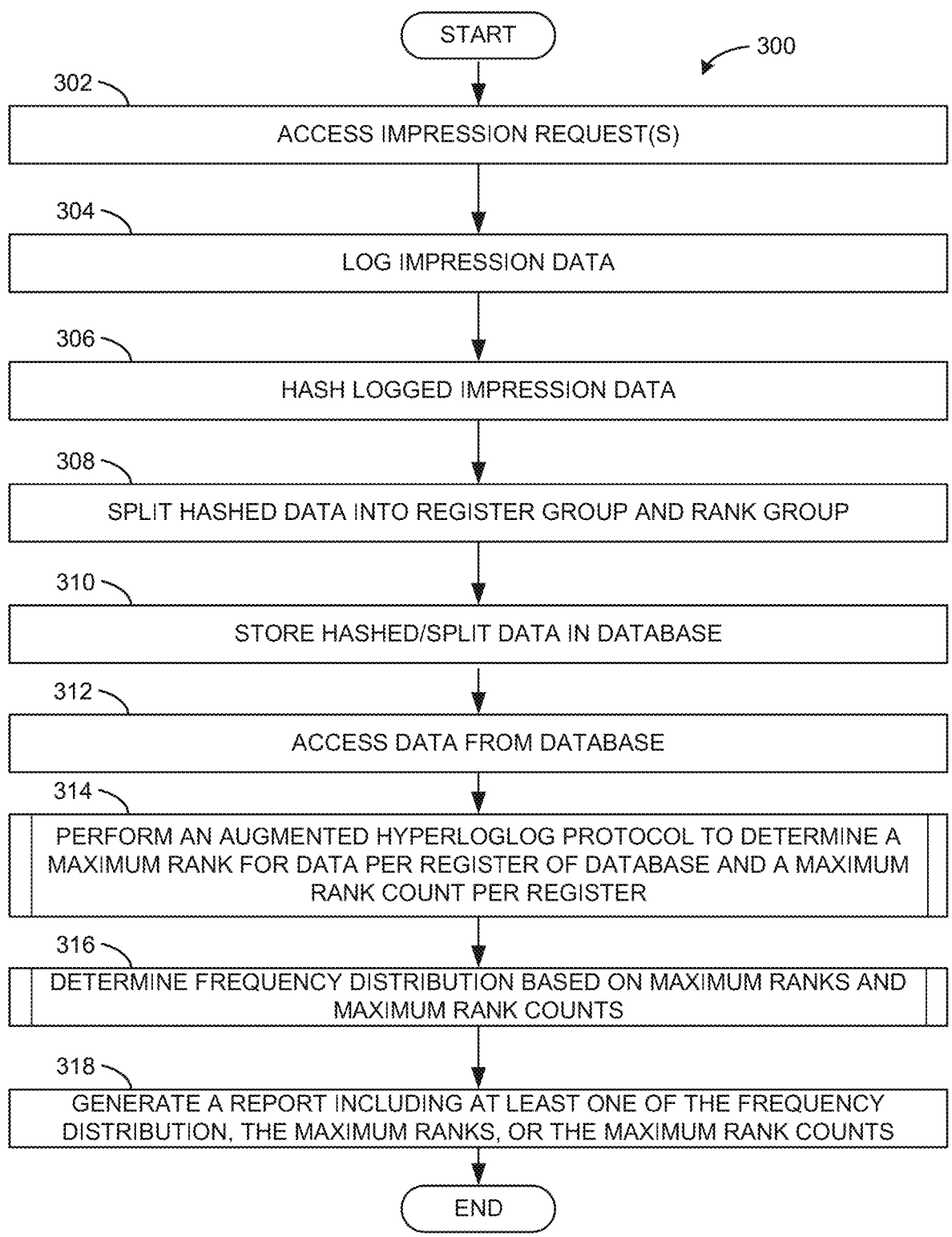
FIG. 3 is a flowchart representative of example machine readable instructions and/or example operations that may be executed by example processor circuitry to implement the example audience measurement entity circuitry of FIG. 2 to determine a frequency distribution, one or more maximum ranks, and/or one or more maximum rank counts for data stored across different registers.
Figure 4:
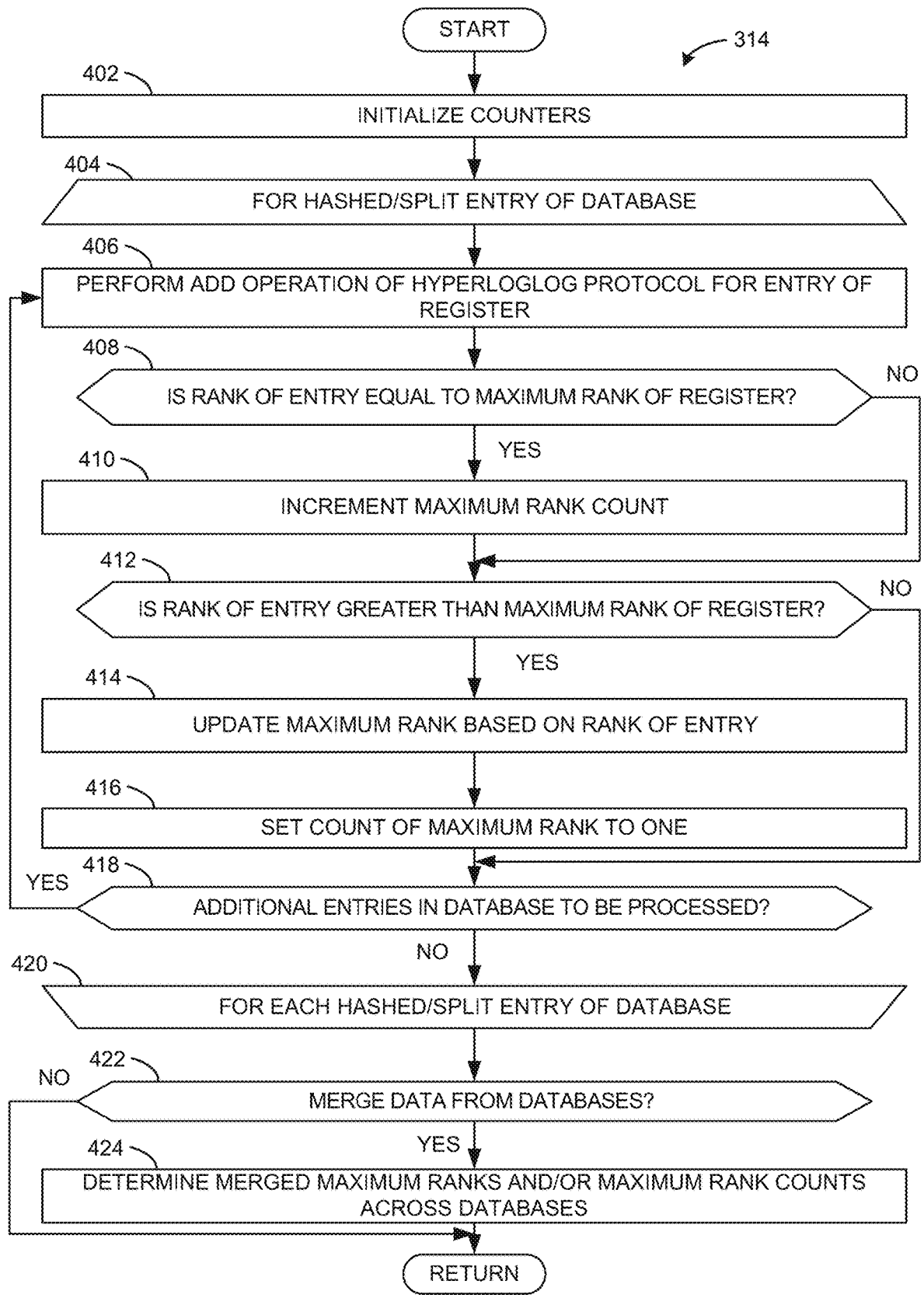
FIG. 4 is a flowchart representative of example machine readable instructions and/or example operations that may be executed by example processor circuitry to implement the example audience measurement entity circuitry of FIG. 2 to perform an augmented hyperloglog protocol.
Figure 5:
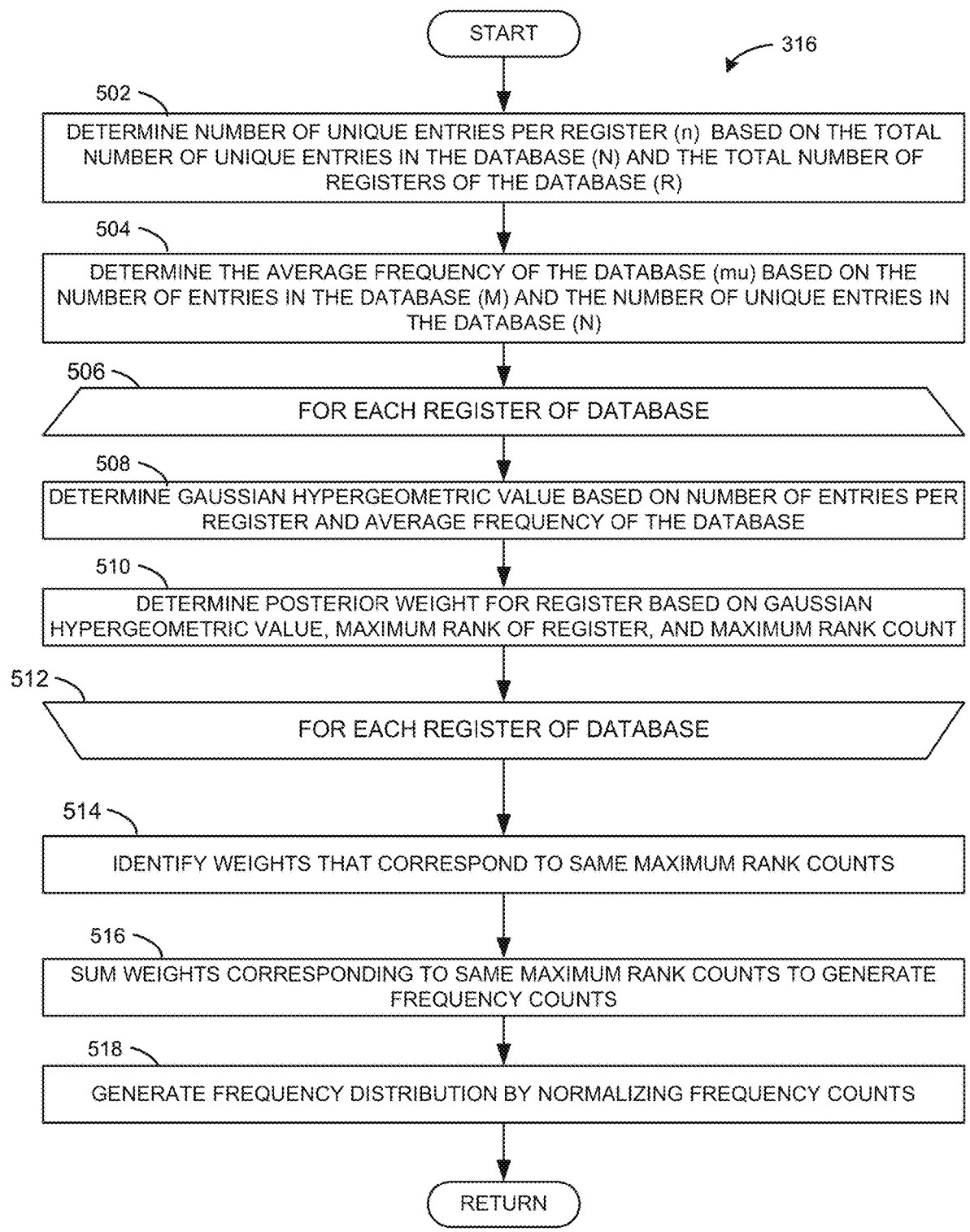
FIG. 5 is a flowchart representative of example machine readable instructions and/or example operations that may be executed by example processor circuitry to implement the example audience measurement entity circuitry of FIG. 2 to determine a frequency distribution.

Flowcharts representative of example hardware logic, machine readable instructions, hardware implemented state machines, and/or any combination thereof for implementing the server 113 and/or the audience measurement entity circuitry 114 of FIG. 2 are shown in FIGS. 3-5. The machine readable instructions may be one or more executable programs or portion(s) of an executable program for execution by a computer processor and/or processor circuitry, such as the processor 712 shown in the example processor platform 500 discussed below in connection with FIG. 7. The program(s) may be embodied in software stored on a non-transitory computer readable storage medium such as a CD-ROM, a floppy disk, a hard drive, a solid-state driver (SSD), a DVD, a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) is/are described with reference to the flowcharts illustrated in FIGS. 2-4, many other methods of implementing the example audience measurement entity circuitry 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 illustrates an example flowchart representative of example machine readable instructions 300 that may be executed by the audience measurement entity circuitry 114 of FIG. 2 to implement a portion of the augmented hyperloglog protocol. Although the flowchart of FIG. 3 is described in conjunction with impression data and the example audience measurement entity circuitry 114 of FIG. 2, the instructions may be executed by any computer device with any type of data.

At block 302, the example server 113 (FIG. 1) accesses, obtains, and/or receives impression request(s) 106 (FIG. 1) from the example client device 102 (FIG. 1) via network communications (e.g., corresponding to the network 104 of FIG. 1). In some examples, the server 113 obtains information corresponding to the impression request(s) 106 from the example database proprietor 110 (FIG. 1), as further described above in conjunction with FIG. 1. As described above, the impression requests 106 include information related an access of media (e.g., an advertisement, a show, a podcast, a video, audio, an image, etc.) by one or more of client devices 102. At block 304, the example server 113 logs the impression data. At block 306, the example hashing circuitry 203 (FIG. 2) hashes the logged impression data. For example, the hashing circuitry 203 may hash each logged impression and/or an identifier of the logged impression using a binary hash. At block 308, the example data splitting circuitry 204 (FIG. 2) splits the hashed data of each entry into a register group (e.g., corresponding to the first b bits of the hash) and a rank group (e.g., corresponding to the remaining bits of the hash). At block 310, the example data splitting circuitry 204 stores the hashed and split impression data in the example database(s) 202 (FIG. 2).

At block 312, the example augmented hyperloglog circuitry 205 (FIG. 2) accesses hashed and split data from the database(s) 202. The data could be any type of data, including demographic impression data and/or any other data related to tracking access to media, shopping visits, vehicle traffic, etc. The data may have duplicate entries corresponding to the same data. For example, if the data is impressions data, there may be data entries that correspond to an identifier of an audience member's exposure to media. If the audience member was exposed to the media twice, there will be two entries in the database for the two exposures, even though only one person was exposed to the media. The registers may include impressions counts, but a unique audience is not known. For example, although there may be 100 impressions in a first database, it will not be known how many people correspond to the 100 impressions and/or how many times each person accessed the corresponding media. At block 314, the example audience measurement entity circuitry 114 performs an augmented hyperloglog protocol to determine a maximum rank for data per register of the database 202 and a maximum rank count per register, as further described below in conjunction with FIG. 4. In the context of impression counts, the maximum rank of each register may represent the position of the left most one in the rank group of the hash of the identifier and/or the number of leading zeros corresponding to the hash of the identifier (e.g., a number, an IP address, an address, an email address, etc.) included in a logged impression plus one. An example describing maximum ranks is further described below in conjunction with FIG. 6. At block 316, the example audience measurement entity circuitry 114 determines the frequency distribution based on the maximum ranks and maximum rank counts of the registers of the database 202, as further described below in conjunction with FIG. 4. In the context of impression counts, the frequency distribution represents how many of the unique impressions for media occurred once, twice, etc. (e.g., the frequency that the impressions occurred). For example, if an impression corresponding to a first panelist appears twice, an impression corresponding to a second panelist appears once, and an impression corresponding to a third panelist appears twice, the frequency distribution identifies that an estimate that there were three unique entries, one of which appeared once and two of which appeared twice. Thus, the frequency distribution identifies how if people are viewing media once or multiple times (e.g., repeat customers vs one time customers). At block 308, the example reporting circuitry 214 (FIG. 2) generates a report including at least one of the frequency distribution, the maximum ranks, or the maximum rank counts. The report may be a visual report including the determined numerical values and/or a visual representation of the determine numerical values (e.g., a graph). In some examples, the report is a data packet that includes the determined information. In some examples, the audience measurement entity circuitry 114 outputs the report via a user interface and/or transmits the report to an external device via a network communication.

FIG. 4 illustrates an example flowchart representative of example machine readable instructions 314 that may be executed by the audience measurement entity circuitry 114 of FIG. 2 to implement an augmented hyperloglog protocol to determine a maximum rank for data per register of the database 202 and to determine a maximum rank count per register, as further described above in conjunction with block 314 of FIG. 3. Although the flowchart of FIG. 4 is described in conjunction with the example audience measurement entity circuitry 114 of FIG. 2, the instructions may be executed by any suitable computer device. Additionally, although the flowchart is described in conjunction with a dataset divided into registers of a database, the flowchart may be described in conjunction with any grouping of data of a dataset.

At block 402, the example augmented hyperloglog circuitry 205 (FIG. 2) initializes the example counter 206 (FIG. 2) (e.g., by setting the counters to 0). The augmented hyperloglog circuitry 205 may utilize a first counter to track the maximum rank and a second counter to track the maximum rank count. Also, as described above, there may be one counter to track the maximum rank and/or maximum rank count for all registers, or multiple counters to track the maximum rank and/or maximum rank count of the multiple registers.

For each hashed and split entry of the database (blocks 404-420), the example augmented hyperloglog circuitry 205 performs an add operation of the hyperloglog protocol for an entry of the register (block 406). In the context of impressions, each hash and split entry may represent an impression of a particular media corresponding to a register. As described above, the hash and split entry corresponds to a register and a rank. For example, the first b bits of the first split of an entry corresponds to the register number and the remaining bits of the second split of the entry corresponds to a rank (e.g., the position of the leftmost one of the second split and/or the number of leading zeros of the value in the second split plus one). The add operation is described above in conjunction with Equation 1. The add operation determines the rank of the current entry being processed. At block 408, the example augmented hyperloglog circuitry 205 determines if the rank for the entry is equal to the current maximum rank identified using the Equation 1. If the example augmented hyperloglog circuitry 205 determines that the rank is not equal to the maximum (block 408: NO), control continues to block 412. If the example augmented hyperloglog circuitry 205 determines that the rank is equal to the maximum (block 408: YES), the example augmented hyperloglog circuitry 205 increments the maximum rank count (e.g., T[j]) for the register (block 410).

At block 412, the example augmented hyperloglog circuitry 205 determines if the rank of the current entry is greater than the maximum rank corresponding to the previously processed entry(ies). If the example augmented hyperloglog circuitry 205 determines that the rank of the current entry is not greater than the maximum rank corresponding to the previously processed entry(ies) (block 412: NO), control continues to block 418. If the example augmented hyperloglog circuitry 205 determines that the rank of the current entry is greater than the maximum rank corresponding to the previously processed entry(ies) (block 412: YES), the example augmented hyperloglog circuitry 205 updates the maximum rank based on the rank of the current entry (block 414) and the example augmented hyperloglog circuitry 205 sets the counter 206 corresponding to the maximum rank count to one (1) (block 416).

At block 418, the example augmented hyperloglog circuitry 205 determines if there are additional entries in the database 202 to be processed. If the example augmented hyperloglog circuitry 205 determines that there is at least one additional entry to be processed (block 418: YES), control returns to block 406 to process the additional entry. If the example augmented hyperloglog circuitry 205 determines that there is no additional entry to be processed (block 418: NO), control continues to block 422. At block 422, the example database merging circuitry 212 (FIG. 2) determines if the data from multiple databases need to be merged. For example, if the augmented hyperloglog process was separately performed on two or more databases, the example database merging circuitry 212 can determine that the data from multiple databases need to be merged by determining merged maximum rank per register across databases and/or merged corresponding maximum rank counts across databases. For example, if each database includes entries for impressions of media corresponding to the database, the database merging circuitry 212 may merge the databases corresponding to impressions for the different media, different time periods, etc. For example, merging exposure data related to a first day with exposure data related to a second day can generate the same results as combining the data before performing the augmented hyperloglog process, but with less resources.

If the example database merging circuitry 212 determines that the data does not need to be merged (e.g., because the data is from a single database) (block 422: NO), control returns to block 316 of FIG. 3. If the example database merging circuitry 212 determines that the data needs to be merged (e.g., because the data is from more than one database) (block 422: YES), the example reporting circuitry 214 determines the merged maximum ranks and/or the merged maximum rank counts across databases (block 424) using the above Equation 3, and control returns to block 316 of FIG. 3.

FIG. 5 illustrates an example flowchart representative of example machine readable instructions 316 that may be executed by the audience measurement entity circuitry 114 of FIG. 2 to determine the frequency distribution based on the maximum ranks and maximum rank counts, as further described above in conjunction with block 316 of FIG. 3. Although the flowchart of FIG. 5 is described in conjunction with the example audience measurement entity circuitry 114 of FIG. 2, the instructions may be executed by any computer device. Additionally, although the flowchart is described in conjunction with a dataset divided into registers of a database, the flowchart may be described in conjunction with any grouping of data of a dataset.

At block 502, the example frequency distribution circuitry 210 (FIG. 2) determines the unique number of entries per register (n) (e.g., corresponding to unique impressions) based on the total number of unique entries in the database(s) 202 (FIG. 2) and the total number of registers of the database (R). For example, if the total number of unique impressions in the database(s) 202 is 500,000 and the total number of registers is 4,096, the example frequency distribution circuitry 210 determines the number of unique impressions per register to be n=122 (e.g., n=500,000/4096). At block 504, the example frequency distribution circuitry 210 determines the average frequency of the database (p) based on the length of the database (M) (e.g., the number of impressions including duplicate impressions) and the number of unique entries in the database (N). For example, if the length of the database(s) 202 is 3,000,000 and the number of unique impressions in the database is 500,000 (obtained from the hyperloglog protocol), the frequency distribution circuitry 210 determines that the average frequency of the database is 6 (e.g., µ=3,000,000/500,000). The average frequency may be the average number of impressions per user for the media corresponding to the database.

For each register in the database 202 (blocks 506-512), the example frequency distribution circuitry 210 determines the Gaussian hypergeometric value based on the number of entries (e.g., impressions) per register (e.g., corresponding to particular media) and the average frequency of the database (e.g., the average number of users per impression) (block 508). Using the above example, if a particular register results in a maximum rank of 10 and the maximum rank of 10 occurred 30 times (e.g., determined using the augmented hyperloglog protocol), the example frequency distribution circuitry 210 determines the Gaussian hypergeometric value using the above Equation 16 (e.g., $_2F_1(1-n, 1-t; 2; s)$). To determine the value of s, the example frequency distribution circuitry 210 may use the above Equation 18. For example, the frequency distribution circuitry 210 determines the value of s to be 1/(5,110) (e.g., $$\left(\frac{1}{2^{10}-2}\right)\left(\frac{1}{6-1}\right) = \frac{1}{5,110}.$$

In such an example, the frequency distribution circuitry 210 determines the Gaussian hypergeometric value to be 1.38301 based on the determined s value.

At block 510, the example frequency distribution circuitry 210 determines the posterior weight for the register based on the Gaussian hypergeometric value, the maximum rank of the register, and the maximum rank count. For a specific value within an array T for frequency, the sum of the corresponding posterior weights, once normalized, represents the probability that the observed values of T came from a single entry for the corresponding register with the corresponding maximum rank. In some examples, the frequency distribution circuitry 210 can determine the posterior weight for the register using the above Equation 17. Using the example above, the frequency distribution circuitry 210 determines the posterior weight to be 0.723163 (e.g., Pr (X=1|Z=30)=1/1.38301=0.723163). At block 514, the example frequency distribution circuitry 210 identifies weights from the multiple determined posterior weights of the multiple registers of the database that correspond to the same maximum rank counts. For example, the below Table 1 illustrates example results after a augmented hyperloglog protocol is performed on data in registers of the database 202 and posterior weights of the registers are determined.

TABLE 1

Example results

|  | Reg 1 | Reg 2 | Reg 3 | Reg 4 | Reg 5 | Reg 6 | ... | Reg 4,095 | Reg 4,096 |
|---|---|---|---|---|---|---|---|---|---|
| M[j] | 11 | 13 | 15 | 14 | 10 | 14 | ... | 12 | 10 |
| T[j] | 13 | 12 | 4 | 5 | 16 | 13 | ... | 1 | 13 |
| weight | 0.272 | 0.74 | 0.975 | 0.967 | 0.068 | 0.821 | ... | 1 | 0.105 |

Using the example data from the above Table 1, the example frequency distribution circuitry 210 identifies all the weights that correspond to a maximum rank count of 1, 2, 3, etc. For example, the frequency distribution circuitry 210 identifies that the weights for registers, 1, 6, and 4,096 (e.g., 0.272, 0.821, 0.105, respectively) correspond to a maximum rank count of 13. At block 516, the example frequency distribution circuitry 210 sums the weights corresponding to the same maximum rank counts to generate the frequency values. For example, the frequency value for the maximum rank count of 13 in the above-example is $f_{count}(13)=0.272+0.821+ \ldots +0.105$. At block 518, the example frequency distribution circuitry 210 generates the frequency distribution by normalizing the frequency values to sum up to 100%. After block 518, control returns to block 308 of FIG. 3.

FIG. 6 illustrates the augmented hyperloglog process disclosed herein in conjunction with example data 600. In the example of FIG. 6 there are six entries that correspond to six unique logged impressions stored across four registers (e.g., b=2). However, the logged impressions can be split into any number of registers. Additionally, there may be any number of entries in the database(s) 202. The example data 600 includes example identifiers 602 corresponding to logged impressions, example hashed identifiers 604 corresponding to the identifier 602, example splits 606 of the hashed identifiers 604, an example M arrays 608 resulting from the augmented hyperloglog process, and an example T arrays 610 resulting from the augmented hyperloglog process.

In the example of FIG. 6, the first entry corresponds to a log impression to media for "Alice" at a second duration of time. The example audience measurement entity circuitry 114 processes the logged entry to generate the corresponding binary hash '01001' of the example hashed identifiers 604 and the corresponding split of the example splits 606, corresponding to a register group and a rank group. For example, the [01] represents the binary code for the second register and the [001] corresponds to a rank of three (e.g., corresponding to the position of the leftmost 1). Because the register is two (e.g., binary 01, plus one) and the rank is three, the example audience measurement entity circuitry 114 adds the rank value of three to the second entry of the M array corresponding to identify that three is the current maximum rank of the second register (e.g., M[2]=3 resulting in [0 3 0 0] of the M arrays 608). Because this is the first time that the maximum rank of three has appeared in the second element of the M array, the example audience measurement entity circuitry 114 enters a value of one in the second element of the T array, representing that the maximum rank occurred once so far for the second element (e.g., T[2]=1 resulting in [0 1 0 0] of the T arrays 610).

The second entry corresponds to a log impression to media for "Bob." The example audience measurement entity circuitry 114 processes the logged entry to generate the corresponding hash '10111' of the example hashed identifiers 604 and the corresponding split [10][111] of the example splits 606. The [10] represents the binary code for the third register and the [111] corresponds to a rank of one (e.g., corresponding to the position of the leftmost 1). Because the register is three (e.g., binary 10, plus one) and the rank is one, the example audience measurement entity circuitry 114 adds the rank value of one to the third entry of the M array corresponding to identify that one is the current maximum rank of the third register (e.g., M[3]=1 resulting in [0 3 1 0] of the M arrays 608). Because this is the first time that the maximum rank of one has appeared in the third element of the M array, the example audience measurement entity circuitry 114 enters a value of one in the second element of the T array, representing that the maximum rank occurred once so far for the second element (e.g., T[3]=1 resulting in [0 1 1 0] of the T arrays 610).

The third entry corresponds to a log impression to media for "Alice." The example audience measurement entity circuitry 114 processes the logged entry to generate the corresponding hash '01001' of the example hashed identifiers 604 and the corresponding split [01][001] of the example splits 606. The [01] represents the binary code for the second register and the [001] corresponds to a rank of three (e.g., corresponding to the position of the leftmost 1). Because the register is two (e.g., binary 01, plus one) and the rank is three, the example audience measurement entity circuitry 114 adds the rank value of three to the second entry of the M array corresponding to identify that three is the current maximum rank of the second register (e.g., M[2]=3 resulting in [0 3 1 0] of the M arrays 608). Because this is the second time that the maximum rank of three has appeared in the second element of the M array, the example audience measurement entity circuitry 114 enters a value of two (e.g., increments the value from one to two) in the second element of the T array, representing that the maximum rank occurred once so far for the second element (e.g., T[2]=2 resulting in [0 2 1 0] of the T arrays 610).

The example audience measurement entity circuitry 114 repeats this process for the 4$^{th}$ entry through the 6$^{th}$ entry. For the example data 600, the final M array is M=[0 3 1 2] and the final T array is [0 2 1 2]. Accordingly, based on the example data 600, the maximum rank of register one is zero, which occurred zero times, the maximum rank of register two is three, which occurred two times, the maximum rank of register three is one which occurred once, and the maximum rank of register four is two which occurred twice. The example audience measurement entity circuitry 114 uses the M array to contract a cardinality estimate and uses the T array to determine more information related to frequencies and/or the frequency distribution.

Figure 7:
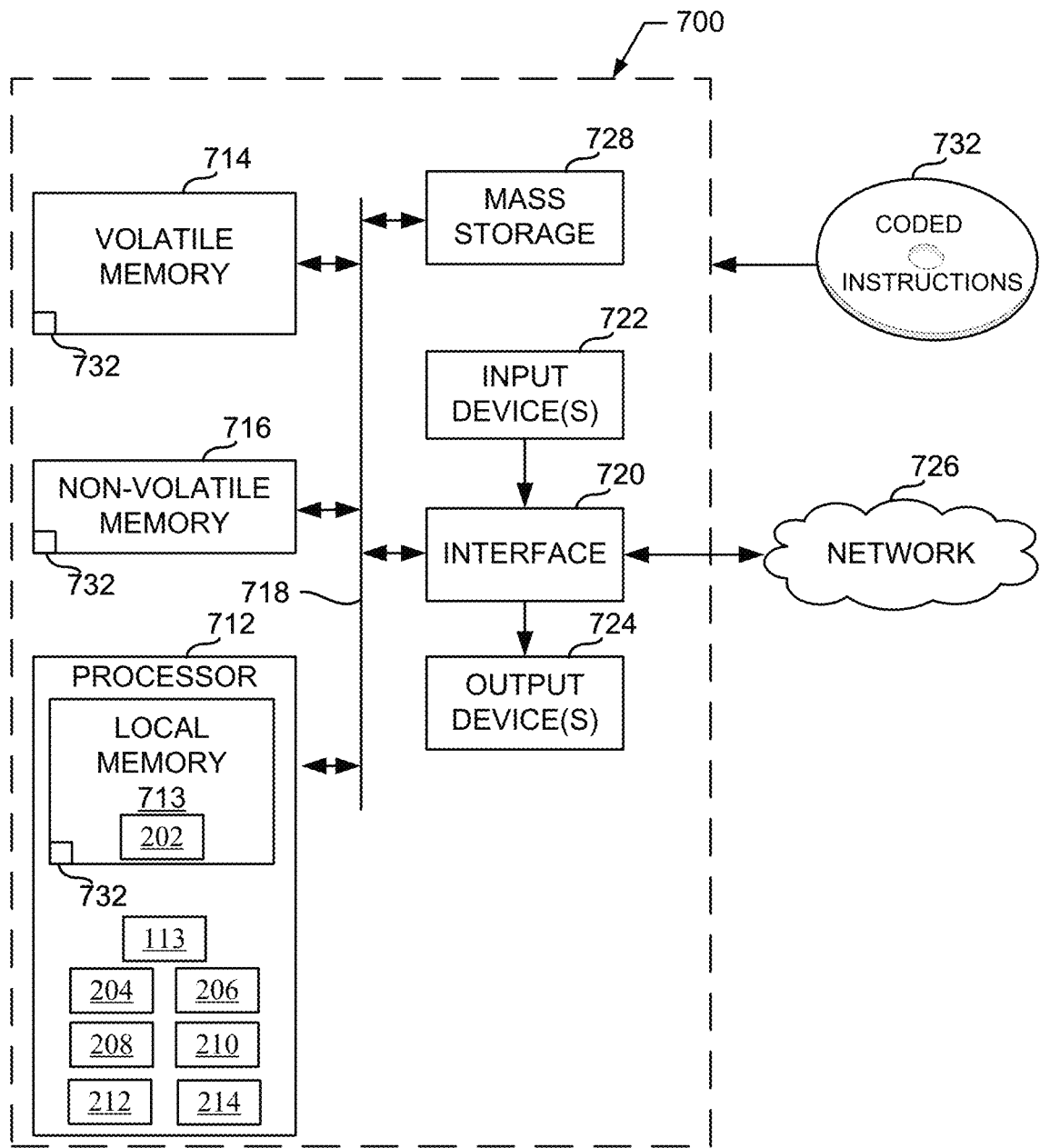
FIG. 7 is a block diagram of an example processing platform including processor circuitry structured to execute the example machine readable instructions and/or the example operations of FIGS. 3-5 to implement the example audience measurement entity circuitry of FIG. 2.

FIG. 7 is a block diagram of an example processor platform 700 structured to execute the instructions 300, 314, 316 of FIGS. 3-5 to implement the audience measurement entity circuitry 114 of FIG. 2. The processor platform 700 can be, for example, a server, a personal computer, a workstation, a self-learning machine (e.g., a neural network, an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example server 113, the example augmented hyperloglog circuitry 205, the example counters 206, the example weight calculation circuitry 208, the example frequency distribution circuitry 210, and the example database merging circuitry 212 of FIG. 2.

The processor 712 of the illustrated example includes a local memory 713 (e.g., a cache). In the example of FIG. 7 the local memory 713 implements the example database(s) 202. However, the volatile memory 714 and/or non-violate memory 716 may implement the example database(s) 202. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

Example machine executable instructions 732 represented in FIGS. 3-5 may be stored in the mass storage device 728, in the volatile memory 714, in the non-volatile memory 716, and/or on a removable non-transitory computer readable storage medium such as a CD or DVD.

Figure 8:
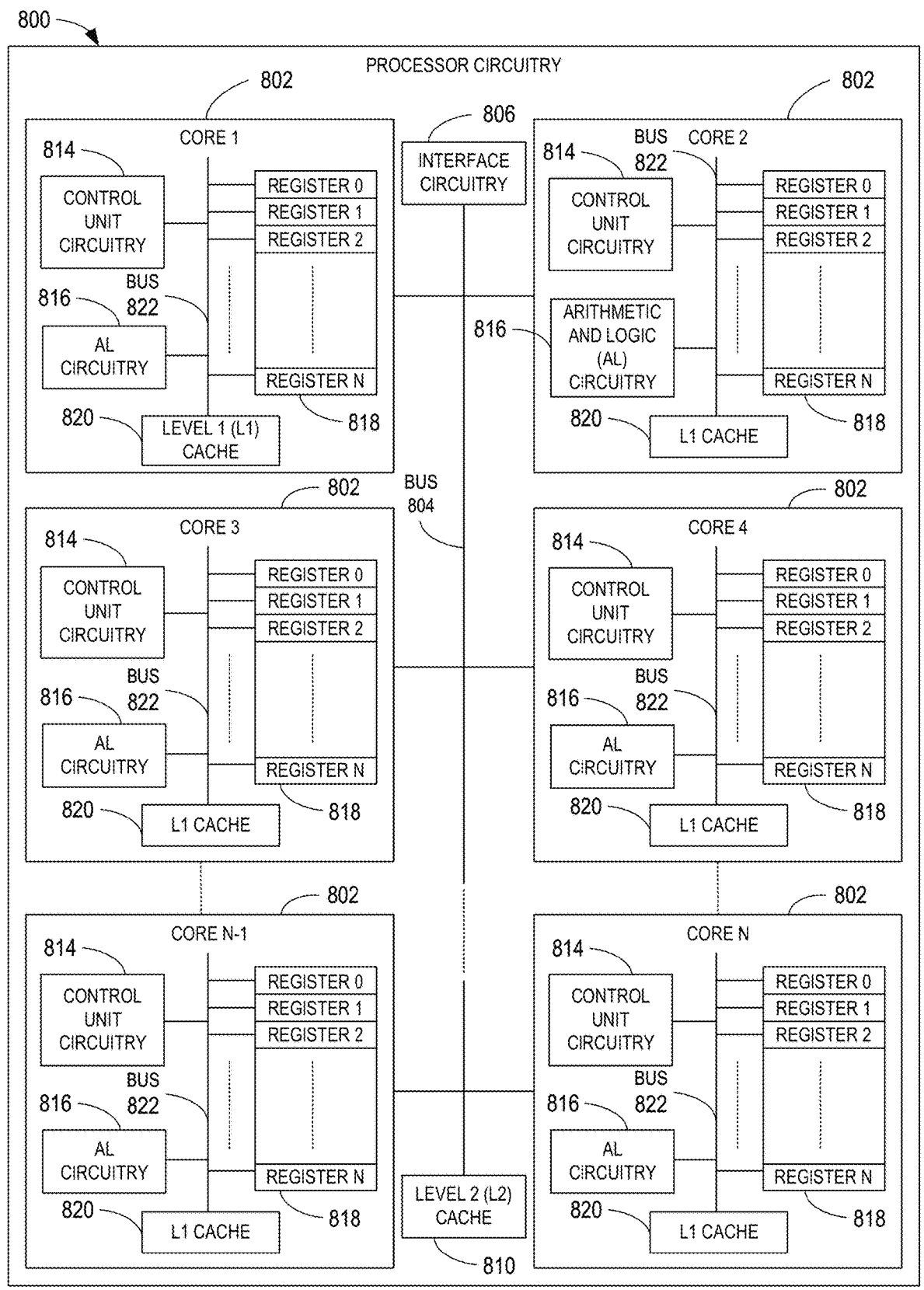
FIG. 8 is a block diagram of an example implementation of the processor circuitry of FIG. 6.

FIG. 8 is a block diagram of an example implementation of the processor circuitry 712 of FIG. 7. In this example, the processor circuitry 712 of FIG. 7 is implemented by a general purpose microprocessor 800. The general purpose microprocessor circuitry 800 executes some or all of the machine readable instructions of the flowchart of FIGS. 3-5 to effectively instantiate the audience measurement entity circuitry 114 of FIG. 2 as logic circuits to perform the operations corresponding to those machine readable instructions. In some such examples, the circuitry of FIG. 2 is instantiated by the hardware circuits of the microprocessor 800 in combination with the instructions. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIGS. 3-5.

The cores 802 may communicate by a first example bus 804. In some examples, the first bus 804 may implement a communication bus to effectuate communication associated with one(s) of the cores 802. For example, the first bus 804 may implement at least one of an Inter-Integrated Circuit (I2C) bus, a Serial Peripheral Interface (SPI) bus, a PCI bus, or a PCIe bus. Additionally or alternatively, the first bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
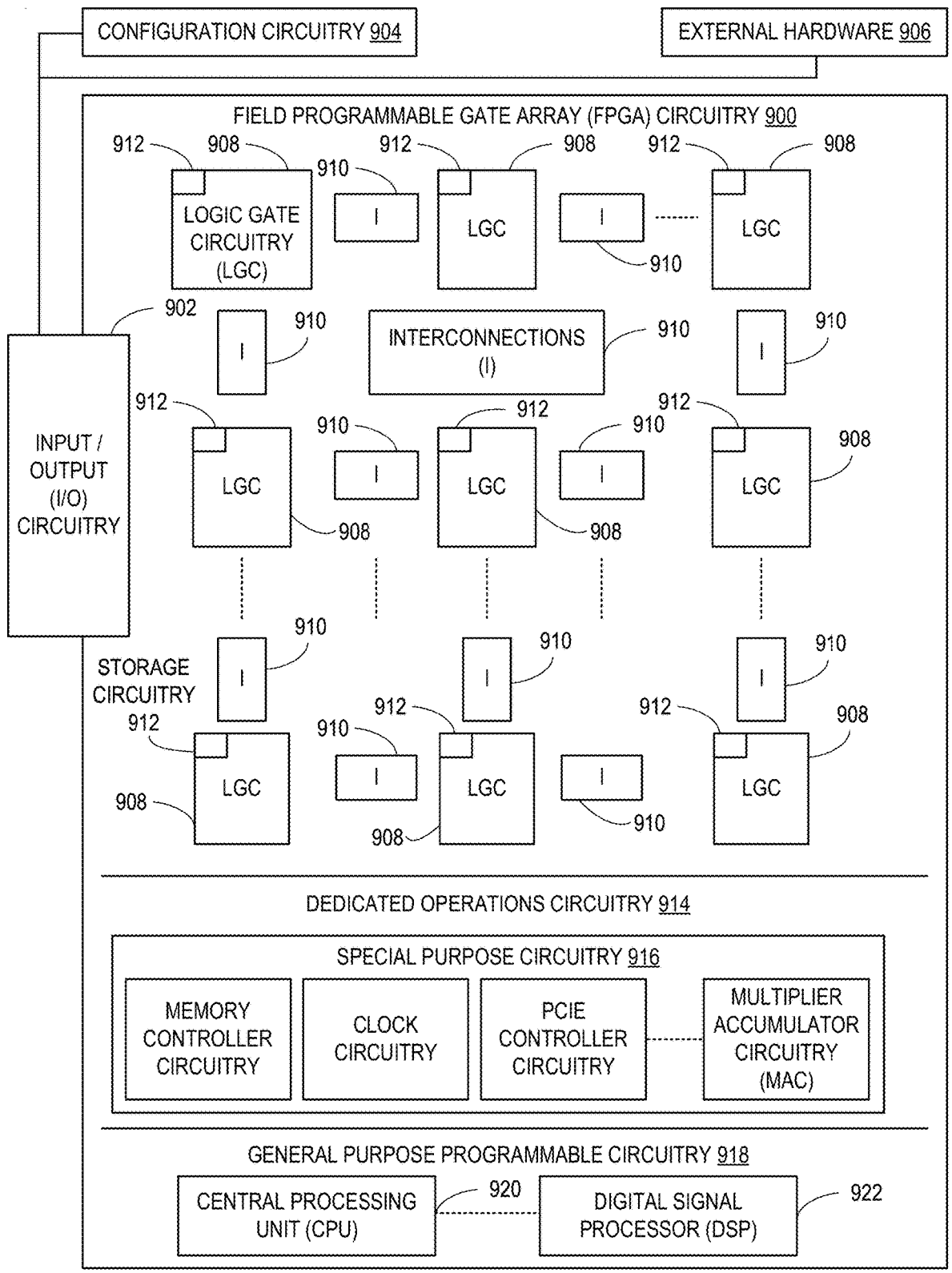
FIG. 9 is a block diagram of another example implementation of the processor circuitry of FIG. 6.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 3-5 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 3-5. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 3-5. As such, the FPGA circuitry 900 may be structured to effectively instantiate some or all of the machine readable instructions of the flowcharts of FIGS. 3-5 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 3-5 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 3-5 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 3-5 may be executed by one or more of the cores 802 of FIG. 8, a second portion of the machine readable instructions represented by the flowcharts of FIGS. 3-5 may be executed by the FPGA circuitry 900 of FIG. 9, and/or a third portion of the machine readable instructions represented by the flowcharts of FIGS. 3-5 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
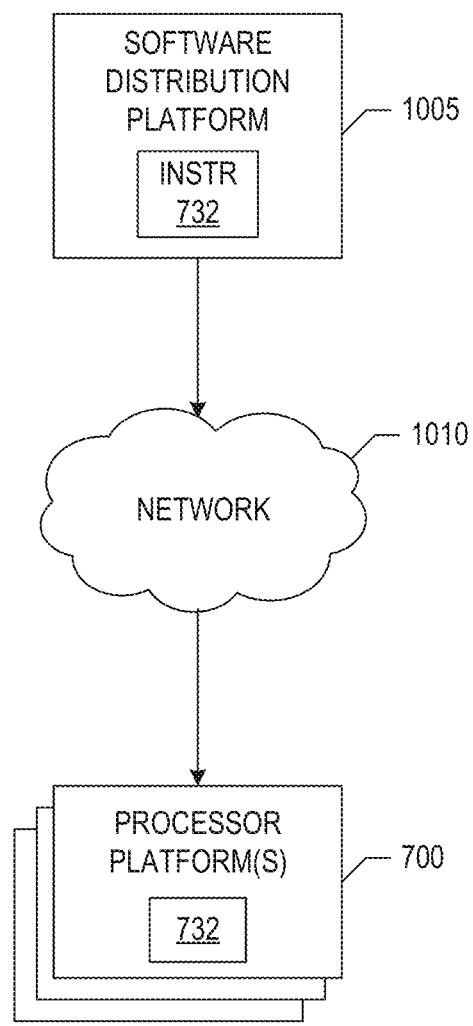
FIG. 10 is a block diagram of an example software distribution platform (e.g., one or more servers) to distribute software (e.g., software corresponding to the example machine readable instructions of FIGS. 3-5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 10. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 300, 314, 316 of FIGS. 3-5 as described above. The one or more servers of the example software distribution platform 1005 are in communication with a network 1010, which may correspond to any one or more of the Internet and/or any of the network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 300, 314, 316 of FIGS. 3-5. may be downloaded to the example processor platform 700, which is to execute the machine readable instructions 732 to implement the example audience measurement entity circuitry 114. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example methods, apparatus and articles of manufacture have been disclosed that determine a frequency distribution for internet-based media. Conventional servers are able to access impression requests to be able to log impressions corresponding to media access. However, such servers obtain large volumes of impression requests. Sorting through such large volume of data requires significant processor and memory resources. Because users are able to view media more than once, there may be 100,000 people exposed to media, but the 500,000 or more impressions associated with the media. Raw impression counts provide little data as to the number of unique viewers and/or how often views are accessing media. Additionally, the impression data may be logged and/or stored in real-time or near-real time. Accordingly, the logged impressions will not be organized when stored. For example, if a user is exposed to mean on Monday and then is re-exposed to the media on Thursday, the number of impressions stored between a first logged impression for the user for Monday and a second logged impression for the user on Thursday may be in the thousands. Thus, there is no easy way to parse through the database of impressions to see which impressions correspond to the same user for the purposes of determining a unique audience. Going through each impression to determine if the impression corresponds to the same computer or person as another one of the 500,000 impressions requires significant resources. Examples disclosed herein reduce the number of resources and memory of analyzing impressions counts to determine both the unique audience and a probability distribution of the unique audience (e.g., a probability corresponding to how many times a user viewed the media once, twice, three times, etc.) based on the raw impressions using an augmented hyperloglog protocol. Accordingly, examples disclosed herein can efficiently process and organize thousands, millions, etc. of impressions to determine unique audience counts and/or frequency distribution using far less resources than traditional techniques. The disclosed methods, apparatus and articles of manufacture improve the efficiency of using a computing device by reducing the amount of processing and memory required to determine the unique audience based on detected impressions. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A apparatus comprising:
at least one memory;
instructions in the apparatus; and
one or more processors configured to execute the instructions to at least:
hash data entries corresponding to impressions logged by a server;
split the hashed data entries into groups corresponding to multiple registers;
determine (a) a maximum rank for each of the multiple registers based on the hashed data entries and (b) a maximum rank count for each of the multiple registers;
determine a frequency distribution based on the maximum ranks and the maximum rank counts; and
generate a report including at least one of the frequency distribution, the maximum ranks, or the maximum rank counts.

2. The apparatus of claim 1, wherein the maximum rank count corresponds to a number of times the maximum rank occurred for a particular register.

3. The apparatus of claim 1, wherein the maximum rank corresponds to a position of a leftmost one during a hyperloglog protocol.

4. The apparatus of claim 1, wherein the one or more processors are configured to determine the maximum rank for the data per register using a hyperloglog protocol.

5. The apparatus of claim 4, wherein the one or more processors are configured to determine the maximum rank count for a register of the registers by, during the hyperloglog protocol:
initializing the maximum rank count;
setting the maximum rank count to one when a first rank determined during a first iteration of the hyperloglog protocol is greater than a current maximum rank of the register; and
incrementing the maximum rank count when a second rank determined a second iteration of the hyperloglog protocol is equal to the current maximum rank of the register.

6. The apparatus of claim 1, wherein the one or more processors are configured to determine the frequency distribution by:
determining a number of unique entries per register;
determining an average frequency of the data entries;
determine gaussian hypergeometric values for the registers based on number of unique entries and the average frequency of the data entries;
determine posterior weights for the registers based on the gaussian hypergeometric values;
sum weights corresponding to same maximum rank counts to generate frequency values; and
generate the frequency distribution by normalizing the frequency values.

7. The apparatus of claim 6, wherein the one or more processors are configured to determine the number of unique entries per register based on a total number of unique entries in a database and a total number of the registers of the database.

8. The apparatus of claim 6, wherein the one or more processors are configured to determine the average frequency of the data entries in a database based on a number of entries in the database and a number of unique entries in the database.

9. The apparatus of claim 1, wherein the one or more processors are configured to log the impressions based on impressions request obtained via network communications, the data including the impressions, the frequency distribution corresponding to a frequency that the impressions occurred.

10. The apparatus of claim 1, wherein the one or more processors are configured to split the hashed data entries into groups corresponds to multiple registers by:
accessing a hash of an entry of the hashed data entries; and
splitting the entry into a first group and a second group, the first group corresponding to a first number of bits of the entry, the second group corresponding to a second number of bits of the entry, a first value of the first group corresponding to a register number for the entry, a second value of the second group corresponding to a rank of the entry.

11. A non-transitory computer readable medium comprising instructions which, when executed, cause one or more processors to at least:
hash data entries corresponding to impressions logged by a server;
group the hashed data entries into groups corresponding to multiple registers;
determine (a) a maximum rank for each of the multiple registers based on the hashed data entries and (b) a maximum rank count for each of the multiple registers;
determine a frequency distribution based on the maximum ranks and the maximum rank counts; and
generate a report including at least one of the frequency distribution, the maximum ranks, or the maximum rank counts.

12. The non-transitory computer readable medium of claim 11, wherein the maximum rank count corresponds to a number of times the maximum rank occurred for a particular register.

13. The non-transitory computer readable medium of claim 11, wherein the maximum rank corresponds to a position of a leftmost one during a hyperloglog protocol.

14. The non-transitory computer readable medium of claim 11, wherein the instructions cause the one or more processors to determine the maximum rank for the data per register using a hyperloglog protocol.

15. The non-transitory computer readable medium of claim 14, wherein the instructions cause the one or more processors to determine the maximum rank count for a register of the registers by, during the hyperloglog protocol:
   initializing the maximum rank count;
   setting the maximum rank count to one when a first rank determined during a first iteration of the hyperloglog protocol is greater than a current maximum rank of the register; and
   incrementing the maximum rank count when a second rank determined a second iteration of the hyperloglog protocol is equal to the current maximum rank of the register.

16. The non-transitory computer readable medium of claim 11, wherein the instructions cause the one or more processors to determine the frequency distribution by:
   determining a number of unique entries per register;
   determining an average frequency of the data entries;
   determine gaussian hypergeometric values for the registers based on number of unique entries and the average frequency of the data entries;
   determine posterior weights for the registers based on the gaussian hypergeometric values;
   sum weights corresponding to same maximum rank counts to generate frequency values; and
   generate the frequency distribution by normalizing the frequency values.

17. The non-transitory computer readable medium of claim 16, wherein the instructions cause the one or more processors to determine the number of unique entries per register based on a total number of unique entries in a database and a total number of the registers of the database.

18. The non-transitory computer readable medium of claim 16, wherein the instructions cause the one or more processors to determine the average frequency of the data entries in a database based on a number of entries in the database and a number of unique entries in the database.

19. The non-transitory computer readable medium of claim 11, wherein the instructions cause the one or more processors to log impressions based on impressions request obtained via network communications, the data including the impressions, the frequency distribution corresponding to a frequency that the impressions occurred.

20. An apparatus comprising:
   interface circuitry to access data from a database, the data stored across multiple registers of the database; and
   processor circuitry including one or more of:
      at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;
      a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or
      Application Specific Integrated Circuitry (ASIC) including logic gate circuitry to perform one or more third operations;
   the processor circuitry to perform at least one of the first operations, the second operations, or the third operations to instantiate:
      hashing circuitry to hash data entries corresponding to impressions logged by a server;
      splitting circuitry to split the hashed data entries into groups corresponding to multiple registers;
      augmented hyperloglog circuitry to determine (a) a maximum rank for each of the multiple registers and (b) a maximum rank count for each of the multiple registers;
      frequency distribution circuitry to determine a frequency distribution based on the maximum ranks and the maximum rank counts; and
      reporting circuitry to generate a report including at least one of the frequency distribution, the maximum ranks, or the maximum rank counts.

* * * * *